(12) United States Patent
Chambliss et al.

(10) Patent No.: US 10,289,515 B2
(45) Date of Patent: May 14, 2019

(54) STORAGE SYSTEM WITH TRACE-BASED MANAGEMENT

(71) Applicant: International Business Machines Corporation, Armonk, NY (US)

(72) Inventors: David D. Chambliss, Morgan Hill, CA (US); Haim Helman, Saratoga, CA (US); Ohad Rodeh, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 891 days.

(21) Appl. No.: 14/321,924

(22) Filed: Jul. 2, 2014

(65) Prior Publication Data

US 2016/0004618 A1    Jan. 7, 2016

(51) Int. Cl.
  *G06F 11/30* (2006.01)
  *G06F 11/34* (2006.01)
(52) U.S. Cl.
  CPC ...... *G06F 11/3034* (2013.01); *G06F 11/3452* (2013.01); *G06F 11/3476* (2013.01); *G06F 11/3409* (2013.01); *G06F 2201/86* (2013.01); *G06F 2201/87* (2013.01)
(58) Field of Classification Search
  CPC ............. G06F 11/3452; G06F 11/3034; G06F 11/3476; G06F 11/3409; G06F 2201/87; G06F 2201/86

USPC .......................................................... 702/179
  See application file for complete search history.

(56) References Cited

U.S. PATENT DOCUMENTS

| | | | |
|---|---|---|---|
| 6,754,704 | B1 | 6/2004 | Prorock |
| 7,539,702 | B2 | 5/2009 | Deshmukh et al. |
| 7,630,994 | B1 | 12/2009 | Deshmukh et al. |
| 7,634,518 | B2 | 12/2009 | Zahavi et al. |
| 8,234,240 | B2 | 7/2012 | Myerson et al. |
| 2003/0172198 | A1* | 9/2003 | Tiwary ................ G06F 11/3414 710/1 |
| 2005/0050269 | A1 | 3/2005 | Horn |
| 2008/0235298 | A1* | 9/2008 | Lin ................... G06F 17/30362 |
| 2008/0270369 | A1* | 10/2008 | Myerson ........... G06F 17/30563 |
| 2011/0320884 | A1 | 12/2011 | Thilagar et al. |

* cited by examiner

*Primary Examiner* — Yoshihisa Ishizuka
(74) *Attorney, Agent, or Firm* — Lieberman & Brandsdorfer, LLC (57) ABSTRACT

Embodiments of the invention relate to storage systems, and for recording event records into a log. Different statistics may be tallied from the log, with the different statistics generating different statistical measurements. The aspect of processing of I/O and preparation of statistical measurements are separated, thereby enabling data structures and algorithms which would not be considered feasible for use as part of I/O processing, because they may compromise the performance or other essential characteristic of I/O processing, to be employed.

20 Claims, 6 Drawing Sheets

STORAGE SYSTEM WITH TRACE-BASED MANAGEMENT

BACKGROUND

The present invention relates to management of a storage system. More specifically, the invention relates to separating I/O processing and statistical measurements, and using the statistical measurement to manage one or more parameter settings.

There are many parameters that influence the way in which operations are performed in a data storage system. These parameters affect the functionality of the storage system, including performance metrics, such as latency and maximum throughput. As different customers have different needs and requirement, some parameters may be changed to accommodate the particulars of a customer environment.

It is known in the art to provide statistical measurements to determine some characteristics of the data and workload experienced by the system, and to select one or more settings for adjustable parameters. Such measurements are aggregated statistics and are generally insufficient for making appropriate decisions for parameter modifications.

SUMMARY

The invention includes a method, computer program product, and system for recording an event log associated with a storage system, processing the event log into a statistical measurement, and using the measurements to support a parameter setting decision.

A method, computer program product, and system are provided for processing an I/O transaction. Metadata from the transaction is recorded into a log, also referred to herein as an event log. This log includes a subset of two or more transaction operations. A summarizer operates on the log and generates a statistical measurement. A parameter setting may be adjusted based on the measurement. More specifically, the measurement is employed to support a decision about a parameter setting, including modifying the setting or allowing the current setting to remain.

BRIEF DESCRIPTION OF THE SEVERAL VIEWS OF THE DRAWINGS

The drawings reference herein form a part of the specification. Features shown in the drawings are meant as illustrative of only some embodiments of the invention, and not of all embodiments of the invention unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

A storage system is provided and configured to maintain an event log containing records for operations of a given type that are performed by the storage system. The operations generally include read and write operations received as commands from one or more hosts serviced by the storage system. In one embodiment, the operations may include operations at other levels. The event log may be processed into statistical measurements, which in one embodiment is conducted by a tool referred to herein as a summarizer. These measurements may then be employed to support decisions about parameter settings. In one embodiment, the summarizer may be changed in the storage system without altering the mechanism for recording and managing the event log. The manner in which the summarizer may be changed enables a new set of statistical measurements to be deployed for use without any disruption to the operations for which the storage system is responsible. At the same time, the system is configured to separate I/O processing from preparation of statistical measurements.

Figure 1:
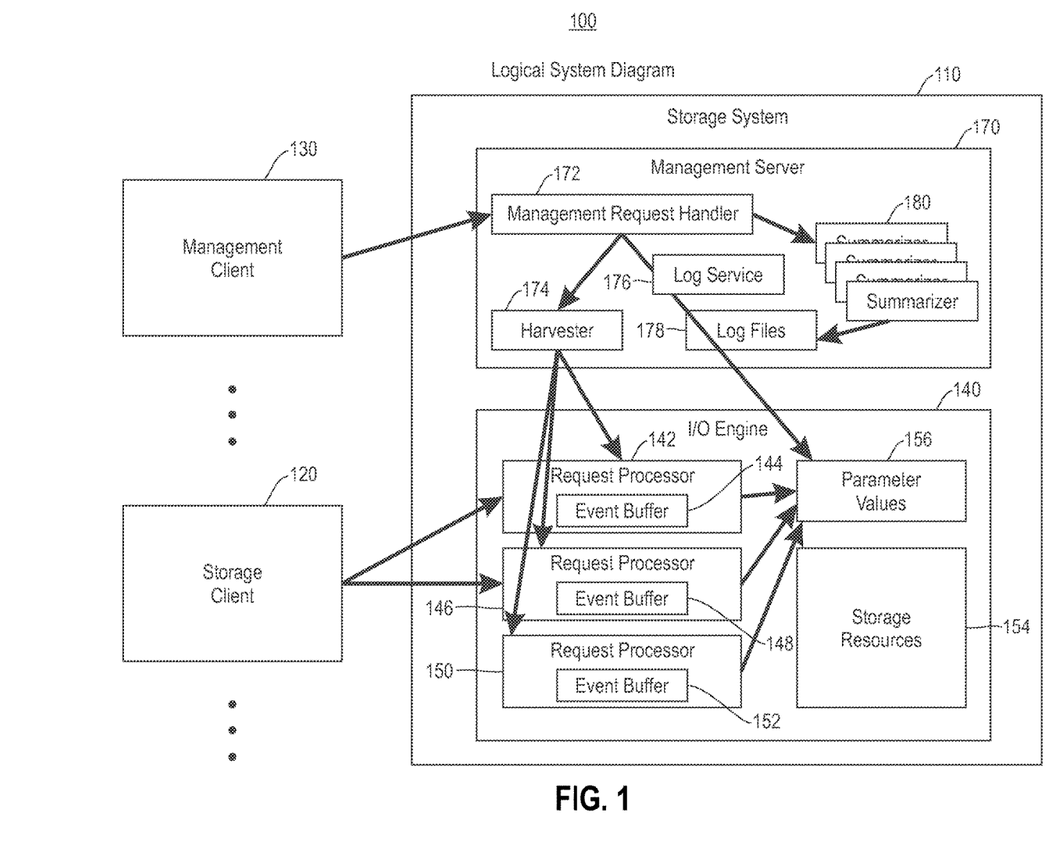
FIG. 1 depicts a block diagram illustrating a logical system diagram.

With reference to FIG. 1, a logical system diagram (100) is provided. Specifically, a storage system (110) is provided in communication with one or more storage clients (120), and one or more management clients (130). The storage system (110) has an I/O engine (140) and a management server (170). The storage client (120) submits a request to the storage system (110), and specifically to the I/O engine (140), which is support by one of the request processors (142), (146), or (150). As shown, in one embodiment, there are three request processors (142), (146) and (150), each with an embedded event buffer (144), (148), and (152), respectively. Upon completion of each read or write operation, an associated request processor inserts a record into an associated event buffer. Although three request processors are shown herein, the quantity should not be considered limiting. Upon receipt of the request, the request processor performs the requested action with use of storage resources (154) of the I/O engine (140) and with reference to parameter values (156) of the engine (140). The storage resources (154) may include, but are not limited to, disk drives, memory, non-volatile memory, solid state disks, etc., as well as processing resources. Multiple request processors (142), (146), and (150) may access resources (154) in common, and in one embodiment do not operate independently.

The parameter values (156) are a set of data that controls interpretation and performance of requests. In one embodiment, the parameter values include configuration information which states the virtual volumes and their sizes. Parameter values may include, but are not limited to, policies and numerical parameter values for data placement, managing quality of service, selecting data to cache and data to migrate, routing of data transfers, compression and de-duplication of data, and different encoding choices for data protection.

The management client (130) submits a request to the management server (170) and to a management request handler (172) that performs the request and returns results. As shown, the management request handler (172) is in communication with a plurality of tools, including a harvester (174), a log service (176) supported by log files (178), and one or more summarizers (180). The log files (178) store transaction metadata, and in one embodiment, the log files include a subset of metadata associated with two or more transaction operations. The request performed by the handler (172) employs one or more of the tools to support the request, including the harvester (174), log files (178), and summarizer (180). As shown, the harvester (174) is in communication with the request processors (142), (146), and (150), each of which may support the request with data in an associated event buffer (144), (148), and (152), respectively. Similarly, the request may be supported with data from the log files (178) via the log service (176) or as directed from one of the summarizers (180). Performance of the request is done for the purposes of monitoring the operations of the storage system, monitoring client(s), setting parameter values, or any combination thereof. Accordingly, the management request handler (172) supports requests received from the management client (130) by way of the harvester (174), as supposed by one or more of the request processors (142), (146), and (150), parameter values (156) of the I/O engine (140), and/or the summarizer(s) (180).

Figure 2:
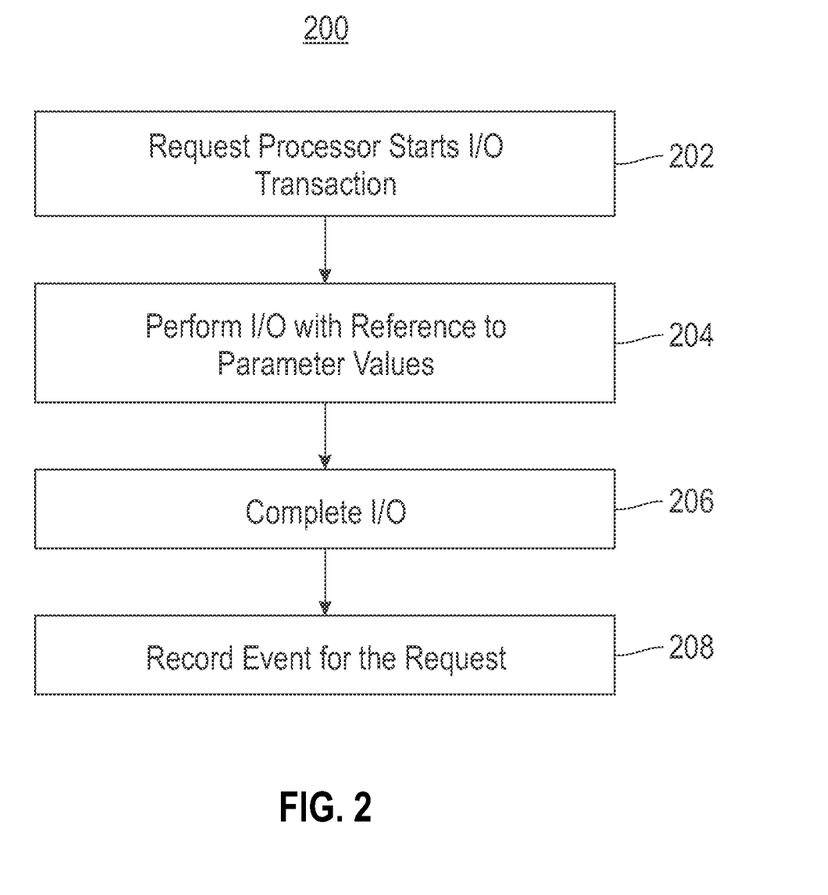
FIG. 2 depicts a flow chart illustrating a process for I/O processing.

Referring to FIG. 2, a flow chart (200) is provided illustrating I/O processing. A request processor starts an I/O transaction (202), and performs the I/O with reference to parameter values (204). The I/O is completed (206), and the event for the request is recorded (208). The event may include characteristics of the request, such as time, I/O type, LBA, size, identifier of the storage client, LUN, service time, time spent for different processing stages of the I/O, total elapsed time, time taken, and/or counts of resource usage. In one embodiment, the event may also include characteristics of the results of the request, such as a datum derived from the data, such as fingerprint or compressibility. Similarly, in one embodiment, the event may include characteristics of processing the request, such as the total elapsed time, and the time taken for steps in the process or counts of resource usage. The event data recorded at step (208) may be recorded into the buffer. In one embodiment, the data in the buffer may periodically be flushed to the log file. Alternatively, in one embodiment, the event data may be recorded directly into the log file. Accordingly, the processing of the I/O may include recording event parameters associated with the I/O request in the buffer.

Figure 3:
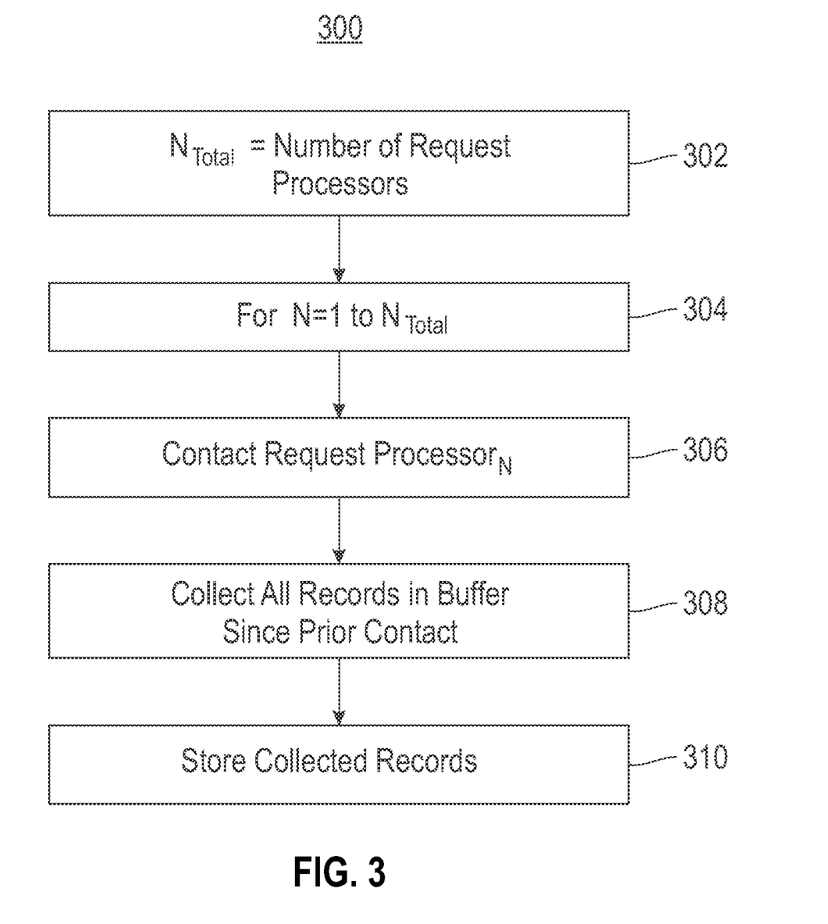
FIG. 3 depicts a flow chart illustrating the functionality of the harvester and the manner in which the records are collected.

Periodically, the harvester contacts each request processor to collect all records in the buffer which have been added since the previous contact. The harvester stores the collected records on disk. The records may be separate files. The buffers and the stored files constitute an event log. Referring to FIG. 3, a flow chart (300) is provided illustrating the functionality of the harvester and the manner in which the records are collected. As shown, the variable $N_{Total}$ is assigned to the number of request processors in the I/O engine (302). For each of the request processors (304), represented with the counting variable N, each request processor is contacted (306). All records in each buffer in request processor$_N$ since the prior contact with the associated request processor are collected (308) and stored (310). Accordingly, the harvester functions to communicate with the request processors, and specifically to collect records maintained in the buffer of each request processor.

Figure 4:
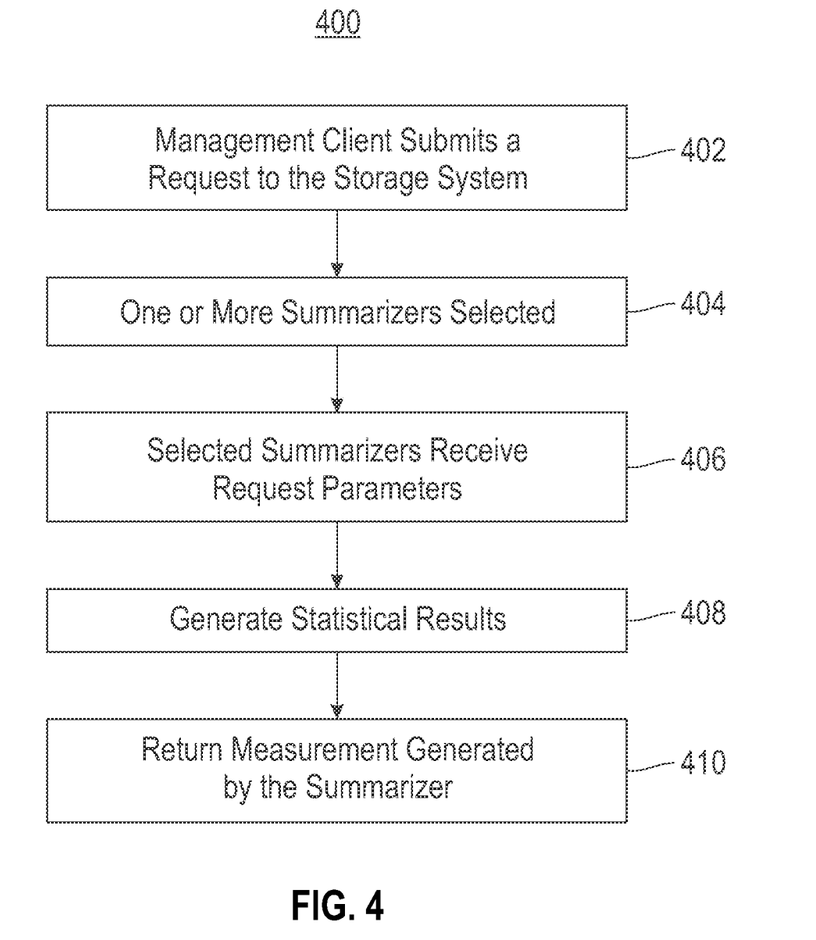
FIG. 4 depicts a flow chart illustrating the functionality of the summarizer as activated in response to an external stimulus.

On a periodic basis, a log-service process processes and maintains stored files of an event log. The process performs several roles, including a lossless compaction of log content to improve efficiency of future uses of the log, and to reduce the on-disk footprint of the log. The process may also perform scheduled summarization activities to read the log content and to generate or update statistical results. Referring to FIG. 4, a flow chart (400) is provided illustrating the functionality of the summarizer as activated in response to an external stimulus. As shown, the management client submits a request to the storage system (402). The management request handler (172) selects one or more of the summarizers based on the received request (404). The selected summarizers receive the parameters associated with the query (406), and generate statistical results (408), e.g. statistical measurement, based on the query parameters. The measurement generated by the summarizer is returned to the management client as a result of the request. That result may be employed to support a decision about a parameter setting. For example, in one embodiment, a parameter setting in the system may be considered for modification, and the statistical measurement returned from the summarizer may be employed to support a decision for modification of the setting or in one embodiment to oppose the modification. Similarly, in one embodiment, the measurement may be employed to indicate the extent of the setting modification.

The summarizer(s) work with the log service and associated log file(s). The data maintained in the log, hereinafter referred to as log data, can be on disk, and in one embodiment may be compressed. In the event the log data is compressed, the data needs to be decompressed for analysis. Similarly, in one embodiment, the log data can be in RAM, or partially in RAM and partially on disk, with the analysis combining parts of the log from RAM and from disk. The statistical results are returned to the request (410). In one embodiment, the procedure associated with the summarizer(s) may be asynchronous, and the response to the request may be returned before the summarization is complete. Similarly, in one embodiment, the stimulus may be a part of query language, so that the stimulus is received with query parameters, as shown and described in FIG. 6. In another embodiment, the system may be configured with a library of summarizers, and one or more summarizers are selected based on the query parameters. The log contains a record of transactions, and the summarizer employs the log data to generate the results. In one embodiment, the log is limited to a representative subset of transactions within a designated category that were performed in a select time frame, also referred to herein as a time window. Accordingly, the summarizer(s) employ the log file(s) to support the query and to generate a statistical measurement.

When statistical results are needed for a decision, the results are obtained with the support of one or more summarizers and an associated summarization. Results may be collected and used from a scheduled summarization activity. As shown in FIG. 4, a summarization may be performed on currently retained log data and new results may be generated. If a new summarization activity is scheduled to be applied in the future, such activity may be performed by an associated log service process, and after a sufficient amount of time has passed to yield the required result data, that data is collected and used.

The summarization activity described in FIG. 4 is an analysis performed by a program that processes an event stream to generate output data. The summarization may be an aggregation of events in different categories. In one embodiment, the summarization may be the total number of read and write operations of each possible size in a given time window. The summarization may be a measure that results from simulated operation of an actual or hypothetical system component. In one embodiment, the simulated operation results may include a hit ratio generated in cache, or write amplification in a log-structure array system, both as applied to events that occurred. Similarly, in one embodiment, the simulated operation may be the effect of a change associated with selection to store a subset of volumes in a different manner. In one embodiment, the simulated operation may be a measure of a relationship among multiple events, such as measurements of sequentiality and overwrite frequencies. In another embodiment, the simulated operation may be associated with optimization of system attributes for a range of system choices. In one embodiment, a library of summarization activities are provided, and one or more of the summarization is selected for an appropriate computation, with the selection based on the particulars of the decision.

A summarizer is a piece of executable code that may be added to or removed from the management server. More specifically, the summarizer is added or removed in response to a request from the management client. The addition or removal of the summarizer is conducted without disrupting processing of requests in the I/O Engine, without disrupting recordation of events, and without causing log files to be compromised. The management client may cause a summarizer to be added by submitting a request to the management server that contains as part of its data a representation of the summarizer, for example as a jar file. The request may include credentials and validation data used by the management server to confirm that the management client is authorized to perform the addition, and to confirm that the summarizer being added conforms to requirements of security and quality. When a summarizer is added, the installation includes setting data values in the management server that are used to identify which future queries will be associated with the added summarizer. The management client may cause a summarizer to be removed by submitting a request to the management server that contains as part of its data an identification of the summarizer. The management server may permit a single operation to replace an existing summarizer with another, which is similar in effect to removing one summarizer and adding another summarizer.

The purpose of adding or replacing a summarizer is to enable new queries to be performed, or to improve the way existing queries are conducted. For example, in one embodiment the addition or replacement of a summarizer may increase their speed or improve their accuracy. As one illustration of enabling new queries, an initial summarizer might be able to deliver aggregation results on events selected by data fields contained in the event records being evaluated. In one embodiment, an example of such an aggregation may be all write operations performed on a given volume by a given initiator. A new summarizer might allow events to be selected by additional criteria associated with the relationship between one event and other events. In one embodiment, an example of events to be selected may include events that read an address that has not been read or written in a prior time interval, e.g. previous 60 minutes. In one embodiment, a summarizer is supplied as part of a query and the supplied summarizer is used to perform the query.

Figure 5:
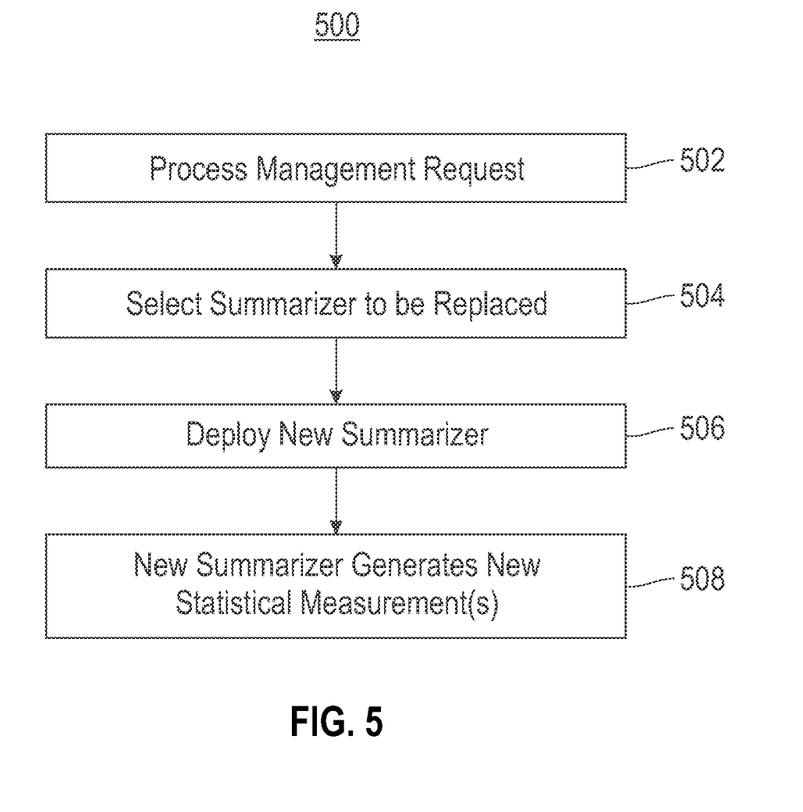
FIG. 5 depicts a flow chart illustrating the aspect of changing the summarizer.

Referring to FIG. 5, a flow chart (500) is provided illustrating the aspect of replacing a summarizer. The basis for the changes is discussed above. In response to receipt of a request from a management client (502), a summarizer to be replaced is selected (504). The aspect of changing the summarizer deploys a new summarizer (506) which generates new statistical measurement(s) (508). As articulated above, the summarizer may remove a prior summarizer and add a new summarizer, or in one embodiment, the summarizer may be a part of the query. The aspect of changing the summarizer, as demonstrated, does not negatively impact the transaction. More specifically, although the summarizer may change, recordation of transaction metadata into the log is maintained. Summarizers are employed to generate statistical data, and may affect a parameter setting. The aspect of changing the summarizer may affect the statistical data generated. More specifically, different summarizers may generate different statistics. In one embodiment, a new statistical measurement may be deployed as a result of changing the summarizer. Accordingly, a new summarizer may be selected from a set of summarizers, or created, based on the received request, to generate relevant statistical measurement data associated with the request.

Figure 6:
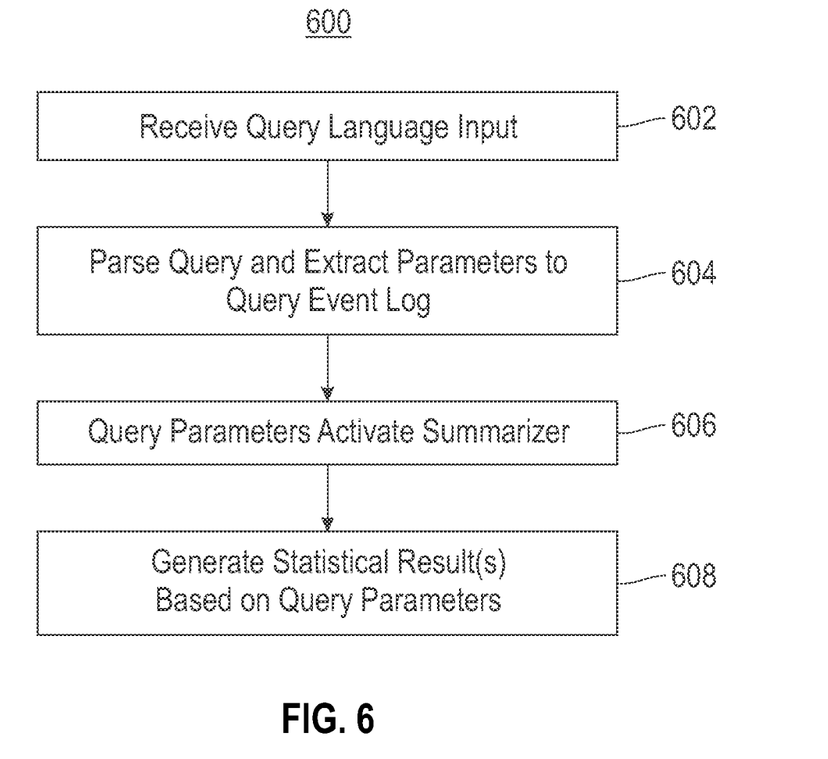
FIG. 6 depicts a flow chart illustrating the embodiment employing the query language with the summarizer.

As shown in FIGS. 4 and 5, a summarizer is employed to statistically assess the data. In one embodiment, the analyses shown in FIGS. 4 and 5 can be expressed in a query language, such as the Structured Query Language (generally called SQL). For example, the summarizer can be a query language that parameterizes the query, such that the request is received with the query. Referring to FIG. 6, a flow chart (600) is provided illustrating the embodiment employing the query language with the summarizer. As shown, query language input is received (602), and the query is parsed so that parameters are extracted to query the event log (604). The parsed query parameters activate the summarizer (606), and statistical results are generated based on the query parameters (608). In one embodiment, the query may be activated by an external stimulus. Accordingly, the employment of the query language to activate the summarizer enables the query to stimulate extraction of data from the event log.

An illustration of what might be done using a query language is described here. The following is pseudo code demonstrating a summarizer that supports a query language submission by the management client:

```
SELECT AVERAGE( InteractiveLatency) FROM
SELECT window1min, Bulklops, InteractiveLatency
FROM
(
( SELECT window1min, count( * )/60 AS Bulklops FROM
all_io_requests WHERE initiator =
BulkJobInitiator GROUP BY window1min )
JOIN
( SELECT window1min, average( latency ) AS
InteractiveLatency FROM all_io_requests WHERE
initiator = InteractiveInitiator GROUP BY window1min )
ON window1min
)
WHERE Bulklops > 20000;
```

The intent of the query shown herein is to measure the effect of a bulk computation job, and I/O it performs on I/O performance delivered to an interactive system. The specific query seeks to measure the average latency experienced by operations requested by an interactive system during time windows in which the number of operations requested by the bulk job is above a certain threshold, e.g. 20000 per second. The query language permits the use of different forms of the selection criteria, which is advantageous because the first form tried might not yield useful results.

The system described above in FIG. 1 has been labeled with tools in the form of processors, storage resources, summarizers, and a harvester. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. The aspect of maintaining the log supports the aspect of deciding which events to evaluate at a later point in time. Different summarizers may be selected and loaded into the system, with different summarizers computing different statistics. Accordingly, the implementation of summarizers to generate a statistical measurement(s) enables the measurement(s) to support decision making with respect to a parameter setting.

Alternative Embodiment

It will be appreciated that, although specific embodiments of the invention have been described herein for purposes of illustration, various modifications may be made without departing from the spirit and scope of the invention. In particular, new analysis tools may be created and incorporated in the library of summarization activities. The new tools can be applied to event log data collected before the tools were incorporated into the library. Accordingly, the scope of protection of this invention is limited only by the following claims and their equivalents.

We claim:

1. A method comprising:
   processing, by a processor, an input/output (I/O) transaction utilizing one or more parameter settings;
   storing transaction metadata in a buffer associated with the processor, including one or more characteristics associated with processing the I/O transaction; and
   separating processing of the I/O transaction from a statistical measurement process, including:
      flushing the transaction metadata from the buffer into a log in a first memory location, wherein the log includes a subset of two or more transaction operations;
      generating, by a summarizer, a statistical measurement including, aggregating the transaction metadata in the log, the aggregating including generating output data while processing a second I/O transaction; and
      adjusting at least one parameter setting based on the output data, including selectively including the summarizer without disrupting processing of an I/O request in an I/O engine.

2. The method of claim 1, wherein the log contains a record of a representative subset of transactions within a designated category performed in a time window.

3. The method of claim 1, wherein the summarizer performs the aggregation and further comprising replacing the summarizer while maintaining storing of the transaction metadata into the buffer.

4. The method of claim 3, further comprising deploying a new aggregation from the replaced summarizer.

5. The method of claim 1, wherein aggregating the transaction metadata utilizes a query language that parameterizes an associated query of the log.

6. The method of claim 5, further comprising an external stimulus activating the aggregation.

7. The method of claim 1, wherein the one or more characteristics associated with processing the I/O transaction are selected from the group consisting of:
   I/O type, logical block address size, identifier of the storage client, logical unit number, service time, time spent for processing a stage of the I/O, total elapsed time, and counts of resource usage.

8. The method of claim 1, wherein aggregating the transaction metadata in the log is conducted without compromising the log file.

9. A computer program product for modification of a parameter setting, the computer program product comprising a non-transitory computer readable storage medium having program code embodied therewith, the program code executable by a processing unit to:

process an input/output (I/O) transaction utilizing one or more parameter settings;

store transaction metadata in a buffer associated with the processing unit, including one or more characteristics associated with processing the I/O transaction; and separate processing of the I/O transaction from a statistical measurement process, including:

flush the transaction metadata from the buffer into a log in a first memory location, wherein the log includes a subset of two or more transaction operations;

generate, by a summarizer, a statistical measurement, including aggregate the transaction metadata in the log, the aggregation including to generate output data while processing a second I/O transaction; and adjust at least one parameter setting based on the output data, including selectively including the summarizer without disrupting processing of an I/O request in an I/O engine.

10. The computer program product of claim 9, wherein the log contains a record of a representative subset of transactions within a designated category performed in a time window.

11. The computer program product of claim 9, wherein program code operates the summarizer to perform the aggregation, and further comprising code to replace the summarizer while maintaining storage of the transaction metadata into the buffer.

12. The computer program product of claim 11, further comprising code to deploy a new aggregation from the replaced summarizer.

13. The computer program product of claim 9, wherein program code to aggregate the transaction metadata utilizes a query language that parameterizes an associated query of the log.

14. The computer program product of claim 13, further comprising an external stimulus to activate the aggregation.

15. A system comprising:

a storage system, including a server having a processor operatively coupled to memory, the server in communication with an input/output (I/O) engine;

the processor to process an I/O transaction utilizing one or more parameter settings;

the processor to store transaction metadata in a buffer associated with the processor, including one or more characteristics associated with the I/O transaction;

a handler in communication with the processor, the handler including one or more tools to separate processing of the I/O transaction from a statistical measurement process, the tools including:

a harvester to flush the transaction metadata from the buffer into a log in a first memory location, wherein the log includes a subset of two or more transaction operations; and a summarizer in communication with the processor, the summarizer to generate a statistical measurement, including aggregate the transaction metadata in the log, the aggregation including to generate output data without disrupting processing of a second I/O transaction; and the handler to selectively include the summarizer without disrupting processing of the I/O request in the I/O engine.

16. The system of claim 15, wherein the log contains a record of a representative subset of transactions within a designated category performed in a time window.

17. The system of claim 15, further comprising the handler to replace the summarizer while maintaining storing of the transaction metadata into the buffer.

18. The system of claim 17, further comprising the handler to deploy a new aggregation from the replaced summarizer.

19. The system of claim 15, further comprising the summarizer being a query language that parameterizes an associated query of the log.

20. The system of claim 15, wherein selective inclusion of the summarizer includes an action selected from the group consisting of: addition and removal.

* * * * *